Patented Aug. 12, 1952

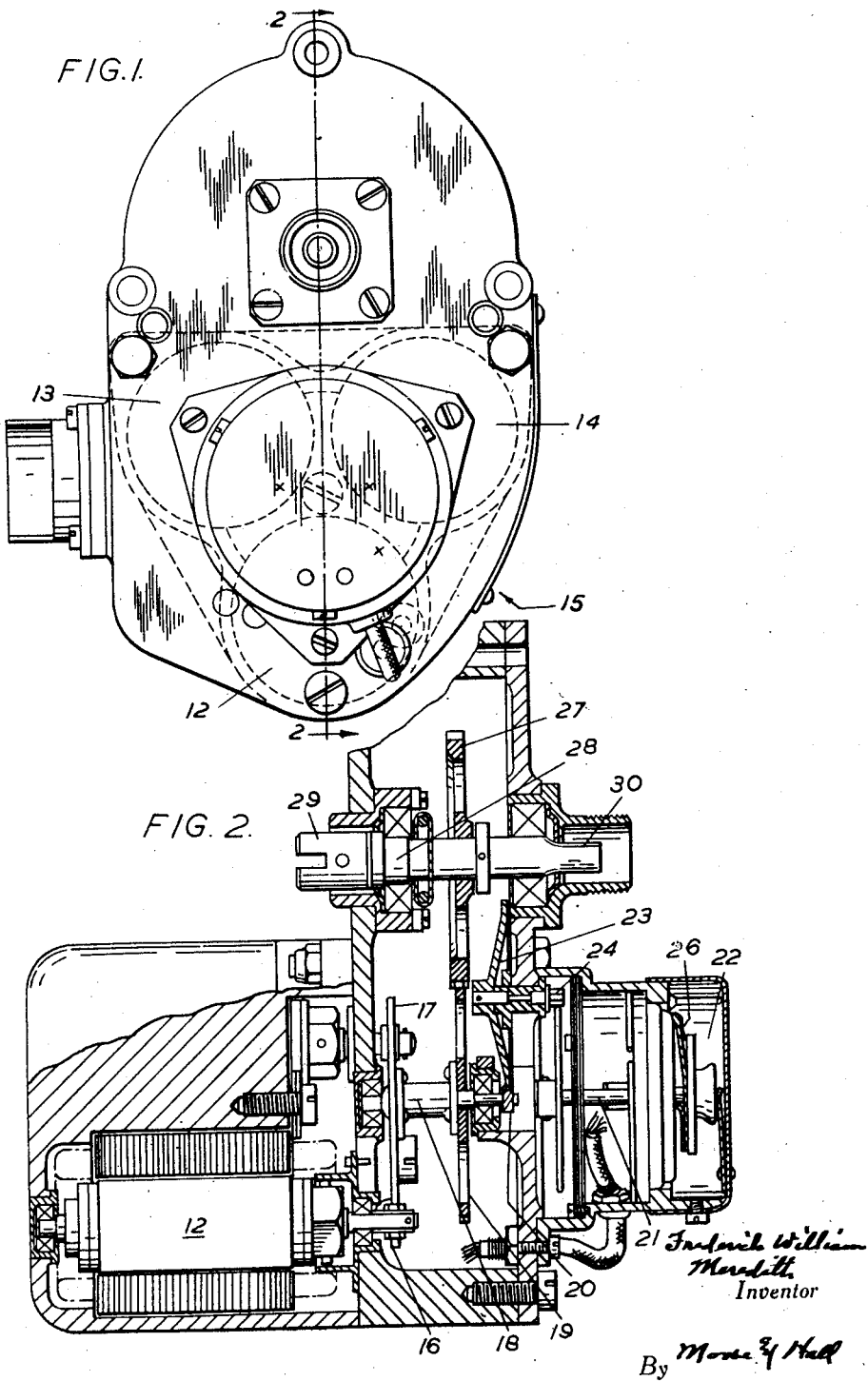

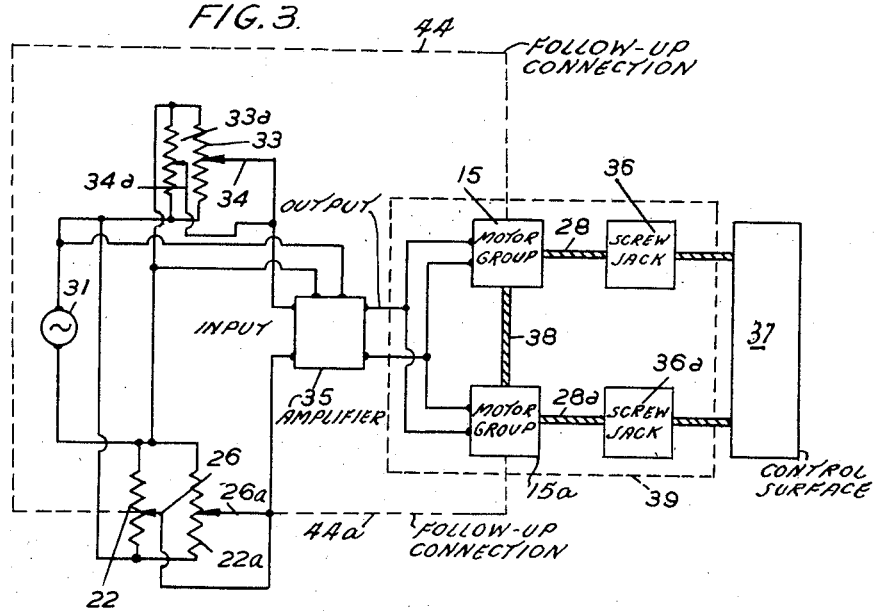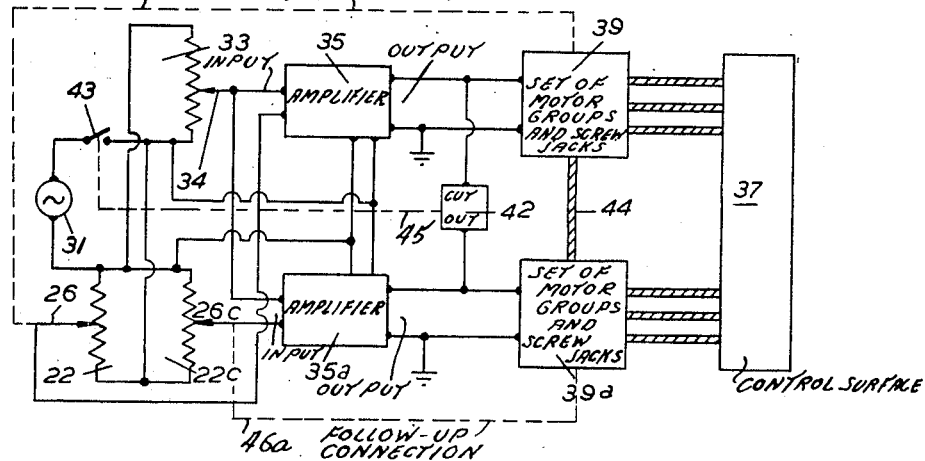

2,607,025

UNITED STATES PATENT OFFICE 2,607,025

APPARATUS FOR ACTUATING CONTROL SURFACES OF DIRIGIBLE CRAFT

Frederick William Meredith, Cricklewood, London, England, assignor to S. Smith & Sons (England) Limited, London, England, a British company Application May 23, 1949, Serial No. 94,886
In Great Britain May 24, 1948

7 Claims. (Cl. 318—19)

1

This invention relates to apparatus for actuating by electric power the control surfaces of dirigible craft. The invention is primarily intended for, but is not restricted to, use on aircraft both heavier and lighter than air, rockets, guided missiles, submarines, torpedoes, ships and the like.

Recently there have become available small electric motors which have extremely low rotor inertia and high starting torque giving rapid acceleration, and which also have high efficiency. Such motors are described, for example in British Patent Specifications Nos. 576,248 and 576,249 and are referred to in the appended claims as "electric motors of the type described."

It is an object of the present invention to provide electrical actuating apparatus for control surfaces which is capable of employing to advantage electric motors having the properties referred to above.

According to the present invention, apparatus for actuating a control surface of a dirigible craft comprises a plurality of sets of groups of electric motors, each group of electric motors having a common output shaft, separate actuating means connected through an irreversible mechanism to each common output shaft for actuating said control surface, means for synchronizing the movements of the output shafts of each of said sets, a common electric supply for all the electric motors, an amplifier for each said set, each amplifier feeding the motors of its set and being fed by said supply, and means for cutting out said supply when the output of an amplifier feeding one set of motors differ from the output from the amplifier feeding another set by more than a predetermined safe amount.

The invention will be more clearly understood from the following description of an example, reference being made to the accompanying drawings in which:

Figure 1 is a side elevation of the assembly of a group of motors;

Figure 2 is a cross sectional view of the assembly of Figure 1; being a section on the line 2—2 of Figure 1;

Figure 3 illustrates schematically the apparatus for actuating the control surface, and Figure 4 shows a modification of Figure 3.

As shown in Figures 1 and 2, each group 15 of motors contains three electrical hysteresis motors 12, 13 and 14 of the type described in British Patent Specification Nos. 576,248 and 576,249 mounted in a casing. Each hysteresis motor carries on its shaft a pinion 16. All three pinions 16 engage a gear wheel 17 on shaft 18,

2 which also carries a gear wheel 19 and pinion 20. Pinion 20 drives the shaft 21 of potentiometer 22 through wheel 23, pinion 24 and wheel 25. The arm 26 of potentiometer 22 is driven by shaft 21.

Gear wheel 19 drives wheel 27 locked to the output shaft 28. Coupling 29 on output shaft 28 is coupled direct to a screw jack acting on the control surface while coupling 30 is connected to a flexible drive from the next group of motors, at least two such groups being employed to actuate the control surface of an aircraft. Each group of motors is provided with a screw jack acting on the control surface and coupling the groups of motors together enables all the screw jacks acting on one control surface to move in synchronism.

Turning now to Figure 3 which shows schematically the control of a number of groups of motors and the actuation of the control surface thereby, 31 is a source of alternating current. Follow-up potentiometers 22, 22a and control potentiometers 33, 33a are connected in parallel across the source 31. Tappings 26, 26a and 34, 34a on the control and follow-up potentiometers are connected to the input of a high gain amplifier 35 which also receives its power-supply from source 31. The output of the amplifier 35, is applied to the input of the motors of two groups 15, 15a of motors having common output shafts 28, 28a respectively, potentiometers 22, 22a being associated with groups 15, 15a respectively, the taps 26, and 26a being moved by the follow-up connections shown schematically by the dotted lines 44 and 44a. Output shafts 28, 28a are connected direct to screw jacks 36, 36a respectively, both of which actuate the control surface 37. Synchronism between the groups 15, 15a is effected by coupling the couplings 30 of the groups 15, 15a by means of the flexible drive 38. The follow-up potentiometers 22, 22a associated with the two groups are used in parallel so that, if one should fail, e. g. by the slider becoming open circuit, the system will still operate.

The potentiometers 33, 33a control the movement of the control surface 37: if the tappings 26, 26a, 34, 34a are in such positions that the voltage applied to the input 35 is zero and if tappings 34, 34a are moved, then the motors will actuate the control surface 37. Rotation of the motors will cause movement of tappings 26 and 26a until the voltage input of amplifier 35 is restored to zero, the torque of motors 36 also being then zero. It will be appreciated that the use of the screw jacks 36, 36a ensures that the control surface 37 will remain in the position to which it is moved without the necessity of the motors exerting a continual torque. The motors can thus be operated so as to deliver considerably greater power when energised, than would be possible if they had to be supplied continuously.

In Figure 4, two sets of groups of motors are employed, each set being fed by a separate amplifier 35, 35a. Amplifier 35 feeds three groups of motors connected in a manner identical to that shown in Figure 3. Block 39 of Figure 4 contains all the components contained in the dotted rectangle 39 of Figure 3, together with a further group of motors and jack. The second amplifier 35a feeds three groups of motors similarly represented by 39a each group actuating the control surface 37 through a separate screw jack as before. Thus, the control surface 38 is driven by six groups of motors containing, in all, eighteen motors.

The input of amplifier 35 is connected to tapping 34 of control potentiometer 33 and tappings 26, 26a, and 26b of the follow-up potentiometers 22, 22a, 22b of the groups of motors in block 39. Similarly, the input of amplifier 35 is connected to tapping 34 and tappings 26c, 26b, 26e of the follow-up potentiometers 22c, 22d, 22e of the groups of motors in 39a. All the potentiometers 22–22e are connected in parallel across the output of source 31. For the sake of clarity only one potentiometer from each set of three is shown. The taps 26 and 26c of the follow-up potentiometers are respectively actuated by the follow-up connections shown schematically by the dotted lines 46 and 46a, in a manner similar to the corresponding taps shown in Fig. 3. A futher flexible shaft 44 connects the two sets of three groups of motors, 39, 39a. The winding of a cut-out 42 is connected between the outputs of amplifiers 35 and 35a. A cut-out 42 operates switch 43 by any suitable conventional means, represented by the dotted line 45. Cut-out 42 is energised sufficiently to operate switch 43 if the outputs of the two amplifiers differ by more than a predetermined amount. Switch 43 is between source 31 and the whole system so that when the voltage across cut-out 42 exceeds a safe predetermined value, the supply of the system is cut-off until the switch is reclosed by hand. Cut-out 42 and switch 43 are provided in order to prevent the control surface 37 from being actuated to a dangerous extent if a fault occurs in the system e. g. by one of the amplifiers 35, 35a giving a false output. If such a fault occurs, the amplifier which is not faulty will energise the motors controlled by its output to oppose those energised by the faulty amplifier; that is the two amplifier outputs will be opposed, the current through cut-out 42 will exceed the safe predetermined value and the system will be cut-out by the opening of switch 43. The acceleration of the control surface obtained with the arrangement described is much greater than would be obtainable with a single motor of the same output power, owing to the improved ratio of torque to rotor inertia obtained. In addition the safety margin provided by the system is enhanced for if a motor, or even a group of motors, should fail the remaining motors will nevertheless be capable of actuating the control surface. Likewise even if a number of the feedback potentiometers 22a, 22e should fail, the system will still be operative.

The above disclosure describes what are at present considered to be the preferred embodiments of the invention. The invention is set forth in generic terms in the appended claims which are intended to cover all forms which fall within the true spirit and scope of the invention.

I claim:

1. Apparatus for actuating a control surface of a dirigible craft comprising a plurality of sets of groups of electric motors, each group of electric motors having a common output shaft, separate actuating means connected through an irreversible mechanism to each common output shaft for actuating said control surface, means for synchronising the movements of the output shafts of each of said sets, a common electric supply for all the electric motors, an amplifier for each said set, each amplifier feeding the motors of its set and being fed by said supply, and means for cutting out said supply when the output of an amplifier feeding one set of motors differs from the output from the amplifier feeding another set by more than a predetermined safe amount.

2. Apparatus as claimed in claim 1 comprising also, for each said set of groups of motors, a follow-up mechanism for reducing to zero the input to the amplifier of the set when the control surface has been actuated to reduce to zero the misalignment between the control surface and a control member.

3. Apparatus for actuating a control surface of a movable craft comprising a plurality of sets of electric motors, the motors of each set being connected to a common output shaft, actuating means connected through an irreversible mechanism to said shaft for actuating said control surface, means for synchronizing the output movements of the sets, an amplifier connected to the motors of each set, supply means for said motors and said amplifiers, and means disconnecting an amplifier from said supply when the output of an amplifier feeding one set of motors differs from the outputs of amplifiers feeding other sets of motors by more than a predetermined safe amount.

4. Apparatus for actuating a control surface of a movable craft comprising a plurality of electric motors, a common output shaft connected to said motors, means connecting said shaft and said control surface for actuation thereof, an irreversible power transmitting mechanism providing one-way transmission of displacement movement to said control surface, means connected to said motors for synchronizing the outputs thereof, amplifiers for said motors, supply means for said motors and said amplifiers, quantitative value comparing means connected to compare the actions of at least two motors on said shaft, and means disconnecting a motor from said supply when said comparing means indicates a difference in output greater than a predetermined amount.

5. The combination set forth in claim 4 said disconnecting means being actuated by said comparing means.

6. Apparatus for actuating a control surface of a dirigible craft comprising a plurality of sets of groups of electric motors, each group of electric motors having a common output shaft, separate actuating means connected through an irreversible mechanism to each common output shaft for actuating said control surface, means for synchronising the movements of the output shafts of each of said sets, a common electric supply for all the sets, an amplifier for each set, each amplifier feeding the motors of its set and being fed by said supply, for each amplifier an electric follow-up signal generator driven by a group of motors fed by said amplifier, an electric control signal generator, the input to each amplifier being provided by the difference between the signals from its follow-up signal generator and the control signal generator, the connections of each amplifier to its follow-up signal generator and the control signal generator being such that the motors fed by each amplifier run to reduce the amplifier input to zero, and means for cutting out the common electric supply when the output of an amplifier feeding one set of motors differs from the output from the amplifier feeding another set by more than a predetermined safe amount.

7. Apparatus for actuating a control surface of a dirigible craft comprising two sets of groups of electric motors each of said groups having a common output shaft, separate actuating means connected through an irreversible mechanism to each common output shaft for actuating said control surface, means for synchronising the movements of the output shafts of said two sets, a common electric supply for said two sets, an amplifier for each set, each amplifier feeding the motors of its set and being fed by said supply, for each amplifier an electric follow-up signal generator driven by a group of motors fed by said generator, the input to each amplifier being provided by the difference between the signals from its follow-up signal generator and the control signal generators, the connections of each amplifier, its follow-up signal generator and the control signal generator being such that the motors fed by each amplifier run to reduce the amplifier input to zero, and a cut-out connected between the outputs of the amplifiers, said cut-out operating a switch to cut out the common electric supply when the outputs from the amplifiers differ by more than a predetermined safe amount.

FREDERICK WILLIAM MEREDITH.

REFERENCES CITED

The following references are of record in the file of this patent:

UNITED STATES PATENTS

| Number | Name | Date |
| --- | --- | --- |
| 1,430,712 | Wood | Oct. 3, 1922 |
| 1,960,484 | Eskstromer | May 29, 1934 |
| 2,315,110 | Dornier | Mar. 30, 1943 |
| 2,386,219 | Lauck | Oct. 9, 1945 |
| 2,387,795 | Isserstedt | Oct. 30, 1945 |
| 2,463,349 | Baner | Mar. 1, 1949 |